United States Patent
Bi et al.

(10) Patent No.: US 8,575,797 B2
(45) Date of Patent: Nov. 5, 2013

(54) LOW PROFILE PERMANENT MAGNET SYNCHRONOUS MOTOR WITH SEGMENT STRUCTURE

(75) Inventors: Chao Bi, Singapore (SG); Quan Jiang, Singapore (SG); Song Lin, Singapore (SG); Nay Lin Htun Aung, Singapore (SG); Hla Nu Phyu, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 313 days.

(21) Appl. No.: 12/736,740

(22) PCT Filed: May 7, 2008

(86) PCT No.: PCT/SG2008/000167
§ 371 (c)(1),
(2), (4) Date: Feb. 23, 2011

(87) PCT Pub. No.: WO2009/136862
PCT Pub. Date: Nov. 12, 2009

(65) Prior Publication Data
US 2011/0133589 A1     Jun. 9, 2011

(51) Int. Cl.
    *H02K 21/12*     (2006.01)
(52) U.S. Cl.
    USPC ............. 310/49.22; 310/156.01; 310/216.008

(58) Field of Classification Search
    USPC .......... 310/49.15, 49.19, 49.22, 49.29, 49.31, 310/49.33, 49.37, 156.01, 208, 216.007, 310/216.008, 216.109
    See application file for complete search history.

(56) References Cited

U.S. PATENT DOCUMENTS

| | | | |
|---|---|---|---|
| 4,107,559 A | | 8/1978 | Patel |
| 4,333,026 A | * | 6/1982 | Bock et al. .................. 310/49.18 |
| 6,589,180 B2 | * | 7/2003 | Erikson et al. ................ 600/459 |
| 6,594,111 B1 | * | 7/2003 | Oveyssi et al. ............ 360/99.08 |
| 2004/0100161 A1 | * | 5/2004 | Matsushita et al. ........... 310/257 |

FOREIGN PATENT DOCUMENTS

EP        1 414 142        4/2004

* cited by examiner

*Primary Examiner* — Tran Nguyen
*Assistant Examiner* — Naishadh Desai
(74) *Attorney, Agent, or Firm* — Martine Penilla Group, LLP (57) ABSTRACT

A low profile permanent magnet synchronous motor with segment structure. In accordance with this invention, a stator assembly for an electromagnetic motor is provided. The stator assembly has a first stator core and a second stator core that couple windings. Teeth extend outward from each stator core and through the windings to contact the other stator core.

38 Claims, 14 Drawing Sheets

Figure 14

LOW PROFILE PERMANENT MAGNET SYNCHRONOUS MOTOR WITH SEGMENT STRUCTURE

FIELD OF THE INVENTION

This invention relates to an electromagnetic motor. More particularly, this invention relates to a stator in the electromagnetic motor. Still more particularly, this invention relates to two stator cores enclosing windings, and each of the two cores having teeth that extend through the windings and affront magnets on a rotor.

SUMMARY OF THE PRIOR ART

A permanent magnet synchronous motor is an electromagnetic motor typically used in a disk drive system. The motor rotates a disk under a read and/or write head to read data from or write data to the disk. As technologies evolve, more memory is often needed in the processing systems of devices. Often the amount of memory that can be provided in a system is determined by the amount of space that there is available for additional disk drives. Thus, those skilled in the art desire to reduce the size of a disk drive to allow a greater number of disk drives to be placed in a system where space is at a premium in the system.

One obstacle to reducing the size of a disk drive is a stator assembly for the electromagnetic motor that spins the media in the drive. The stator assembly is a component that interacts with magnets on a rotor to spin the media. It is a problem to reduce the size of a stator because of windings in the stator. The windings need sufficient space between turns to assure proper alignment.

One purposed way to reduce the size of a stator assembly is to provide teeth on one stator core. The teeth extend through the windings and affront the magnets on the rotor. There is contact between stator cores on opposite sides of the windings. One example of this proposed system is disclosed in Singapore Patent Application 20007037820-3 filed 25 May 2007. In the proposed system, the stator assembly has a first stator core and a second stator core on opposing sides of the windings. One stator core has teeth that extend through the windings affronting the magnet. Couplings that extend through the windings provide contact between the stator cores.

One problem with this proposed solution is the number of teeth needed to generate the needed electro-motive forces. For example, a motor having eight magnetic pole pairs needs eighteen stator teeth. To provide this number of teeth, the teeth must be thin and small. This causes the teeth to be brittle and vulnerable to breakage doing manufacture and use. Thus, those skilled in the art are still striving to design new stator assemblies that allow the size of the drive to be reduced while being durable and improving motor efficiency.

SUMMARY OF THE INVENTION

The above and other problems are solved and an advance in the art is made by a stator assembly for an electromagnetic motor in accordance with this invention. A stator assembly in accordance with this invention has teeth on both stator cores that extend through the windings. One advantage of a stator in accordance with this invention is that the number of teeth needed to provide the necessary electro-motive forces is less than required if the teeth were only connected to one stator core. Thus, the teeth may be larger. The increased size of the teeth makes the teeth less susceptible to breakage. Larger teeth also make the teeth easier to manufacture which in turn can reduce production costs of an electromagnetic motor.

In accordance with exemplary embodiments of this invention, a stator assembly is configured in the following manner. The stator assembly has windings of conductive material, a first stator core, and a second stator core. The windings are located between the first and second stator cores. The first stator core has teeth extending through a layer defined the windings. The second stator core also has teeth extending through the layer defined by the windings. Preferably, the teeth extend out of the bases of the respective stator cores substantially perpendicular to the base and affront a magnet.

In some exemplary embodiments, the windings are a conductive coil. In other embodiments, the windings are comprised of multiple printed circuit boards. The windings may have a plurality of openings defined through the windings. Couplings from either stator core may then extend through the openings through the windings to cause contact between the two stator cores and magnetic field link with windings. The windings may have an opening in the centre of the windings to allow a rotor to be inserted inside the opening. The teeth from either stator core may also extend through the centre opening. Furthermore, teeth from either stator core may extend towards and contact the other stator core outside windings.

In some exemplary embodiments, the first stator core has couplings to contact with the second stator core. The couplings are coupling teeth that extend outward from a base of the first stator core towards the second stator core. In some embodiments, the couplings are each aligned with one coupling from the second stator core to cause contact. The couplings may be on a surface of the base, an inside edge surrounding a central opening, or along an outside perimeter of the first stator core. Depending upon the embodiment, the teeth of the first stator core may be on the surface of the base, along the inner perimeter, along the centre opening, or along the outer perimeter.

In one particular embodiment, the first stator core is made of an upper portion and a lower portion. The upper and lower portions may be constructed from segments. Each segment having a base with a tooth and a coupling. Both the teeth and coupling extend outward towards the second stator core. The segments are configured to fit together to form the first stator core having upper and lower portions.

In some embodiments, a second stator core is configured in the following manner. The second core has a second set of teeth components that each extend outwards from a first surface towards the windings. Each one of the second set of teeth components is aligned with gaps in the first set of teeth of the first stator core. The teeth may be on the edge of the inside of the centre opening, in the middle of the base or on the outer perimeter depending on the embodiment.

The second stator core also has couplings that promote contact of the second stator core with the first stator core. In some embodiments, the couplings are coupling teeth that extend outward from the first surface of the second stator core towards the first stator core. The coupling teeth extend through openings in the windings and contact coupling teeth of the first stator core.

In a particular embodiment, the first stator core is made of segments. Each segment has at least one tooth and coupling tooth. In a preferred exemplary embodiment, each segment has two teeth at opposing sides of an inner edge of the segment and the coupling tooth is on the outer edge of the segment.

BRIEF DESCRIPTION OF THE DRAWINGS

The above and other features and advantages of a stator assembly in accordance with this invention are described in the following detailed description and shown in the following drawings.

DETAILED DESCRIPTION

This invention relates to an electromagnetic motor. More particularly, this invention relates to a stator for windings in the electromagnetic motor. Still more particularly, this invention relates to two stator cores enclosing the windings with each of the stator cores having teeth that extend through the windings and affronting magnets on a rotor. For purposes of clarity, an element shown in different drawings is given the same reference numeral throughout the drawings.

This invention relates to a stator assembly for an electromagnetic motor such as a permanent magnet synchronous motor used in a hard disk drive to spin a media under read/writes heads. One skilled in the art will recognize that a stator assembly in accordance with this invention may be used in other electromagnetic motors and other types of circuitry requiring a stator for such motors.

Figure 1:
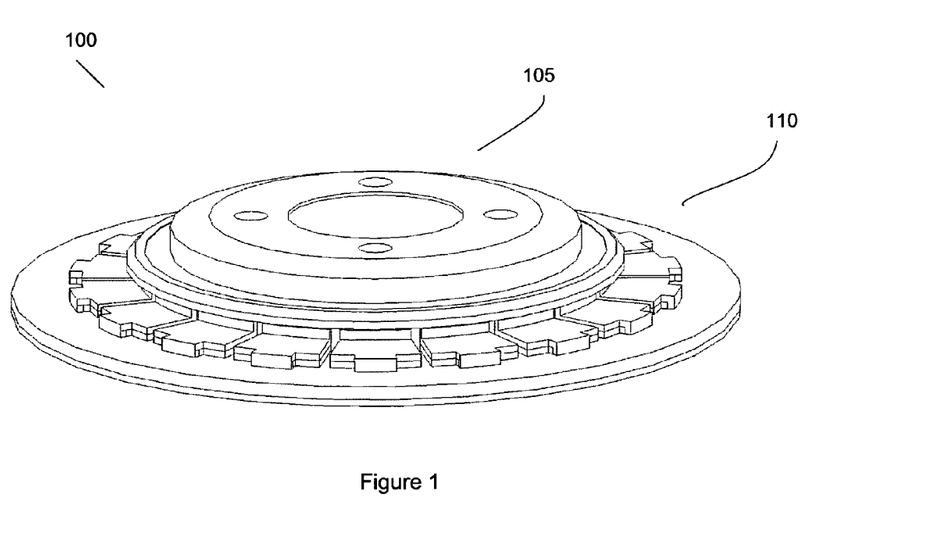
FIG. 1 illustrating a view of an outside of an electromagnetic spindle motor having a stator assembly in accordance with an embodiment of this invention.

FIG. 1 illustrates a rotor and stator assembly for electromagnetic motor 100 in accordance with one embodiment of this invention. Rotor 105 inserts through an opening in stator assembly 110. Magnets (Not shown) on rotor 105 interact with windings (Not Shown) to cause the rotor to rotate when a current is applied.

Figure 2:
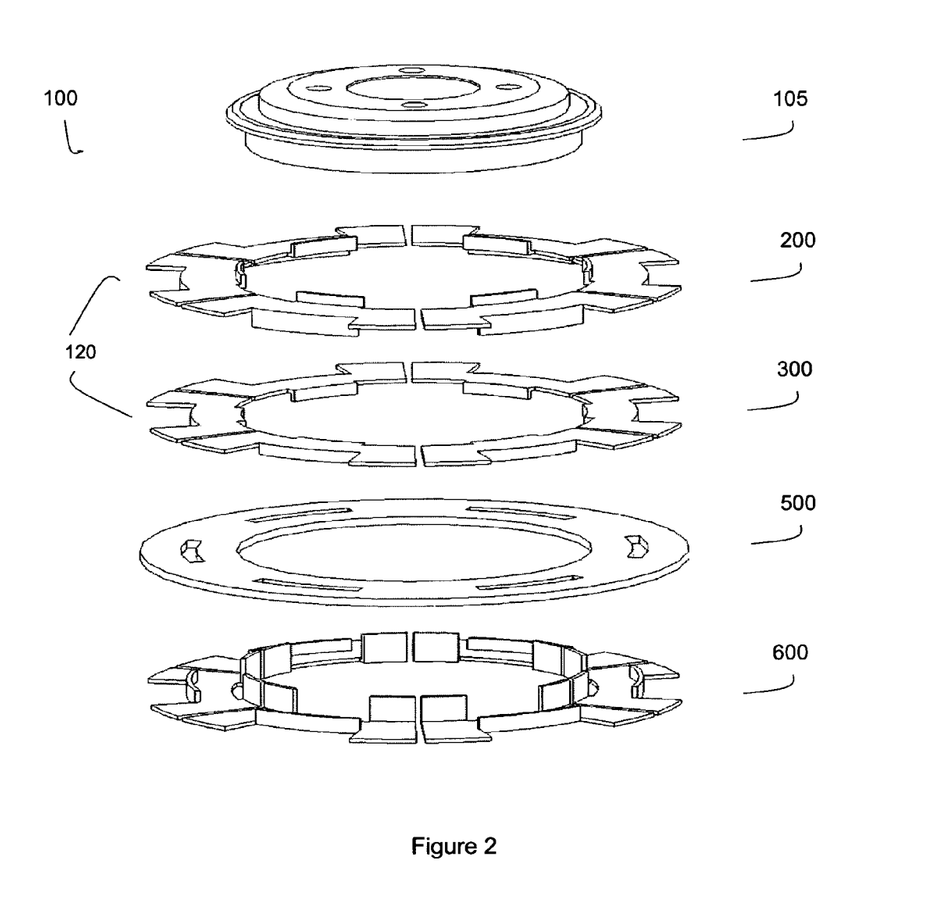
FIG. 2 illustrating an exploded view of components of the electromagnetic motor shown in FIG. 1.

FIG. 2 is an exploded view of motor 100 in accordance with one exemplary embodiment of this invention. In the shown embodiment, motor includes rotor 105 which is inserted into an opening through the stator assembly. The stator assembly comprises the upper layer of the first stator core 120 having an upper layer 200, and lower layer 300; windings 500; and a second stator core 600. In accordance with this embodiment of the invention, first stator core 120, and second stator core 600, each have teeth that extend through the layer of windings 500. This configuration allows stator cores 120 and 600 to have greater amounts of base area to integrate in a process that is similar to adhering. Coupling teeth 212, 312, and 614 on first stator core 120 and second stator 600 form an efficient magnetic circuit with the teeth 211, 311 and 613 surrounding the magnet. The increase in surface area of each of teeth 211, 311 and 613 surrounding the magnet increases the motor constant and torque constant. Teeth 211, 311 and 613 also reduce eddy current loss which in turn improves motor efficiency.

Furthermore, by placing teeth 613 on second stator core 600, the number of teeth can be reduced significantly on the first stator 120. For example, in a motor having eight (8) magnetic pole pairs, eighteen (18) segments, or twenty four (24) segments, are needed on the top stator 120 while only six (6) segments are needed in a stator assembly when the teeth on second stator 600 are used. Since the number of first stator segments is decreased, the density of the windings can be increased due to the reduction of insulation for openings through the windings for the coupling teeth. Also the area of each coupling tooth contacting the windings is increased which increases the mechanical strength of the motor.

Stator assembly is assembled in a following manner in accordance with this embodiment of the invention. Upper portion 200 of first stator core 120 is placed on top of the stator. Upper portion 200 is described in more detail below with regards to FIGS. 3 and 4. Lower portion 300 of first stator core 120 is then placed below the core 200. Lower portion 300 is described in more detail below with regards to FIGS. 5 and 6. FIG. 7 illustrates first core 120 of the stator assembled from upper portion 200 and lower portion 300 in accordance with this embodiment. Windings 500 are placed below lower portion 300. Windings 500 are described in more detail below with regards to FIG. 14. Second stator core 600 is then placed onto windings 500. A detailed description of second stator core 600 is given below with regards to FIGS. 8 and 9. One skilled in the art will recognize that the components may be adhered together or may be held in place by the interlocking components or other mechanical means. This is a design choice left to those skilled in the art.

Figure 3:
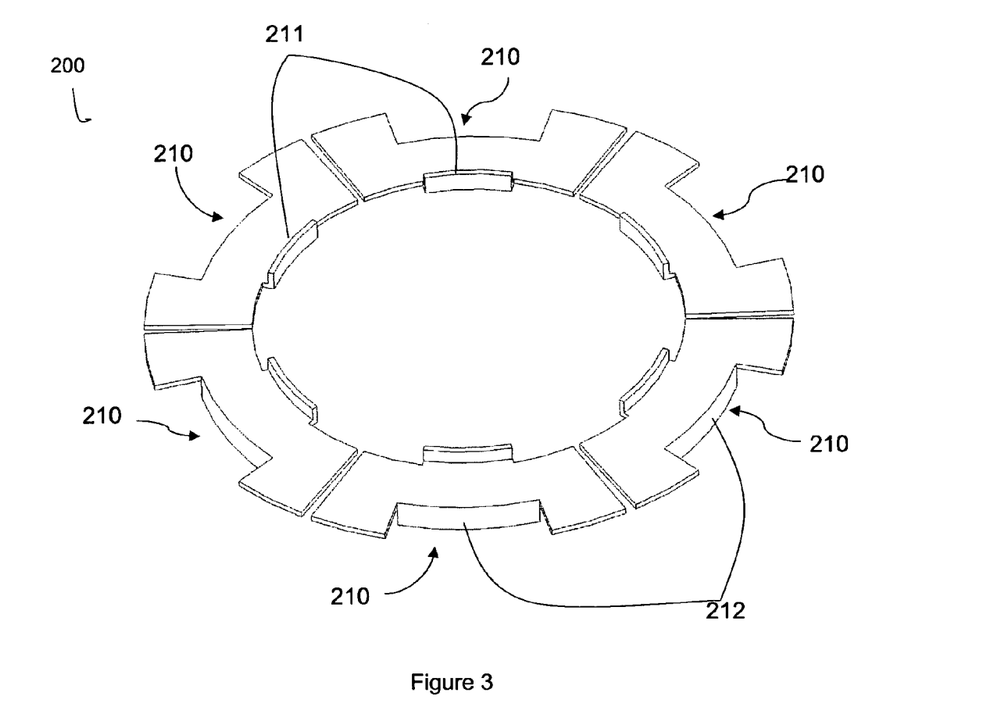
FIG. 3 illustrating top view of the upper portion of the first stator core in accordance with the stator assembly shown in FIG. 2.

FIG. 3 illustrates an isolated view of the upper portion 200 of the first stator core 120 in accordance with one embodiment of this invention. The portion 200 is made of ferrite material. Although, it is envisioned that those skilled in the art can and will use other soft magnetic materials for the components of upper portion 200. In this embodiment, upper portion 200 of the first stator core is made of segments 210, and has teeth 211 arranged concentrically around an opening through which rotor 105 is inserted. Upper portion 210 also has coupling teeth 212 for coupling to winding 500 and linking with second stator core 600.

Figure 4:
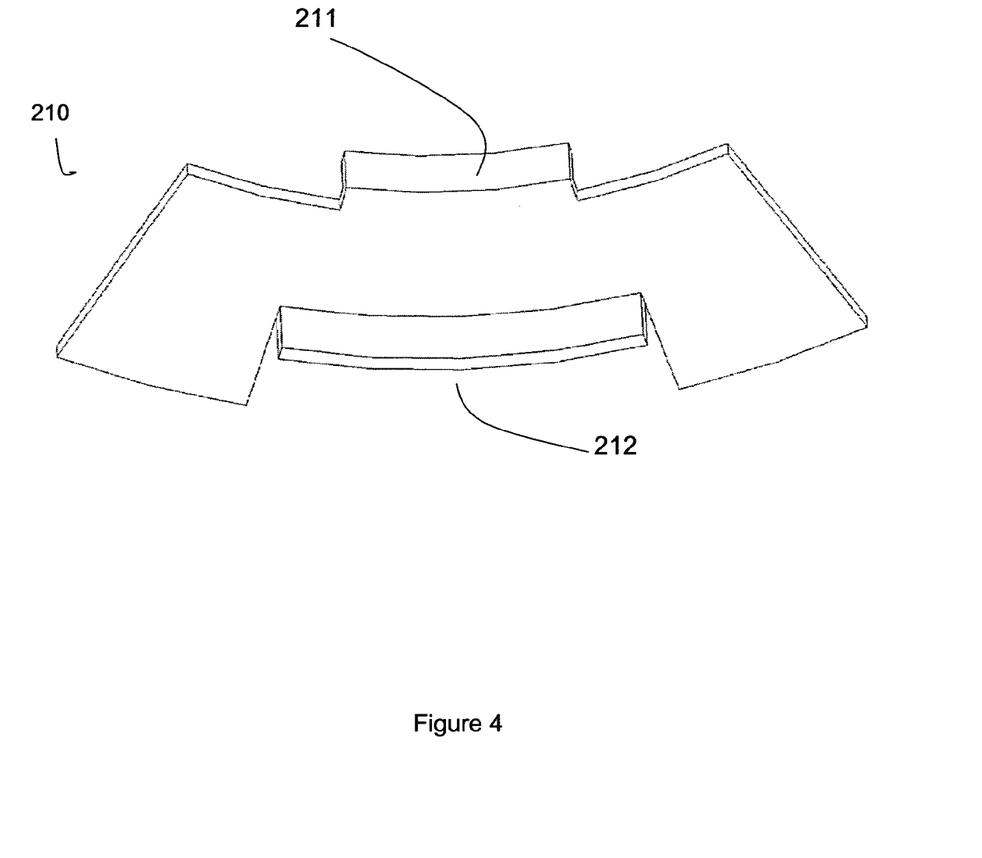
FIG. 4 illustrating a top view of a segment of the upper portion of the first stator core shown in FIG. 3.

FIG. 4 illustrates one segment 210 of upper portion 200. One of Teeth 211 extends outwards from segment 210 in a direction substantially perpendicular to a surface of segment 210 in direction away from second stator 600. Tooth 211 is formed by a portion of segment 210 on the inner edge of segment 210. Tooth 211 may be formed by punching, pressing, folding, or any other method. The exact method of manufacture being a design choice left to one skilled in the art.

Coupling tooth 212 on segment 210 extends downwards substantially perpendicular to a surface of segment 200 in the opposite direction as tooth 211. Coupling 212 extends downwards through an opening in windings 500 and contacts a coupling of second stator core 600. Coupling tooth 210 may be formed by punching, pressing, folding, or any other method. The exact method of manufacture being a design choice left to one skilled in the art. Furthermore, one skilled in the art will recognize that other couplings and locations for the couplings may be changed and these are left for a design choice for those skilled in the art.

Figure 5:
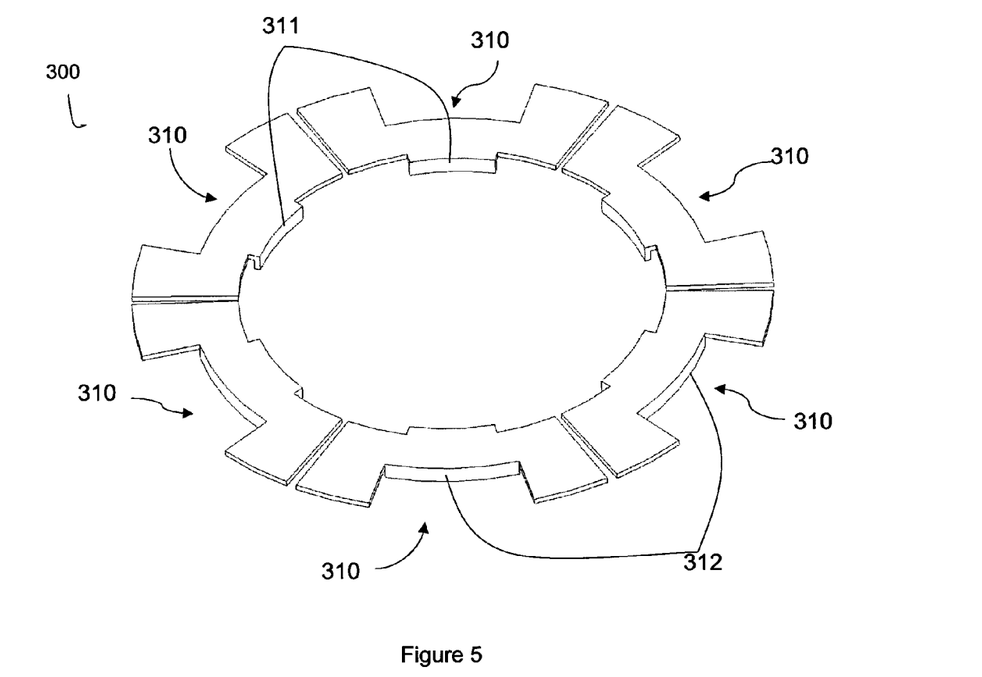
FIG. 5 illustrating top view of the lower portion of the first stator core in accordance with the stator assembly shown in FIG. 2.

FIG. 5 illustrates an isolated view of lower portion 300 of first stator core 110 in accordance with one embodiment of this invention. Lower portion 300 is made of ferrite material. Although, it is envisioned that those skilled in the art can and will use other soft magnetic materials for the components of lower portion 300. In this embodiment, lower portion 300 of the first stator core 120 is made of segments 310, and has teeth 311 arranged concentrically around an opening through which rotor 105 is inserted. It has also coupling teeth 312 for coupling the winding 500 and linking with the second core of the stator 600.

Figure 6:
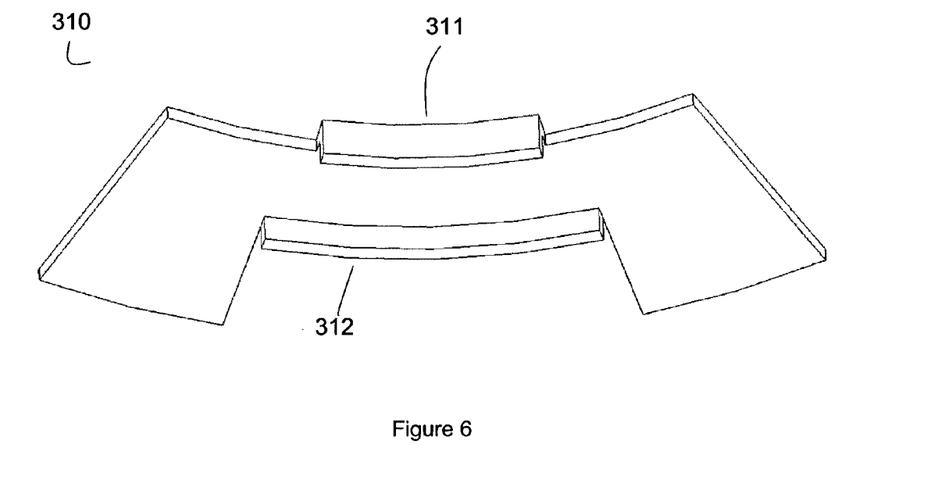
FIG. 6 illustrating a top view of a segment of the lower portion of the first stator core shown in FIG. 5.
Figure 7:
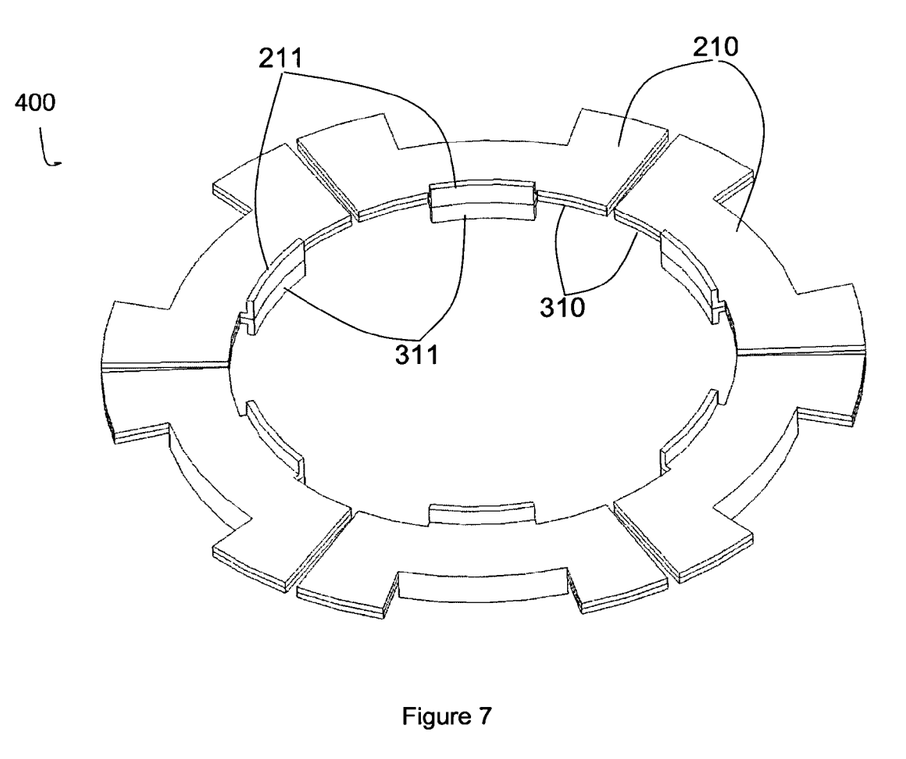
FIG. 7 illustrating a top view of the first stator core formed by the upper portion and lower position in accordance with the stator assembly shown in FIGS. 2 to 6.

FIG. 6 illustrates the structure of one segment 310 of lower portion 300. One of Teeth 311 extends outwards from segment 310 in a direction substantially perpendicular to a surface of segment 310 in direction toward second stator 600. Tooth 311 is formed by a portion of segment 310 on the inner edge of segment 310. Tooth 311 may be formed by punching, pressing, folding, or any other method. The exact method of manufacture being a design choice left to one skilled in the art.

Coupling tooth 312 on segment 310 extends downwards substantially perpendicular to a surface of segment 300 in the same direction as tooth 311. Coupling 312 extends downwards through an opening in windings 500 and contacts a coupling of second stator core 600. Coupling tooth 310 may be formed by punching, pressing, folding, or any other method. The exact method of manufacture being a design choice left to one skilled in the art. Furthermore, one skilled in the art will recognize that other couplings and locations for the couplings may be changed and these are left for a design choice for those skilled in the art.

Figure 11:
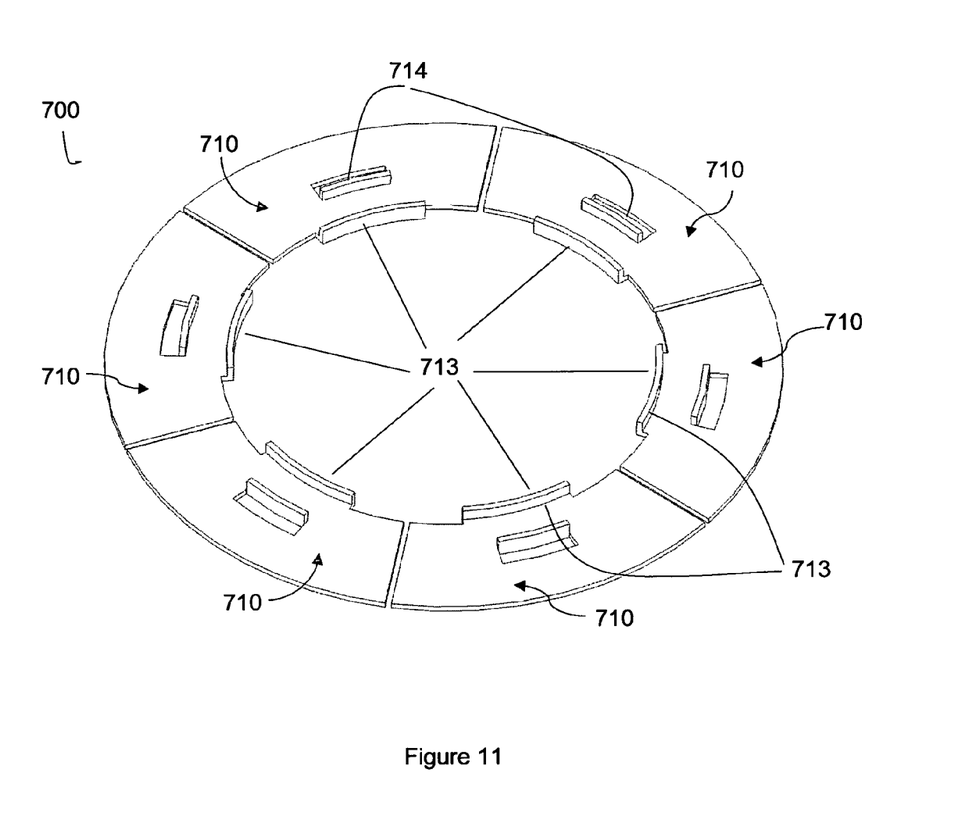
FIG. 11 illustrating a top view of an alternative second stator core in accordance with this invention.
Figure 12:
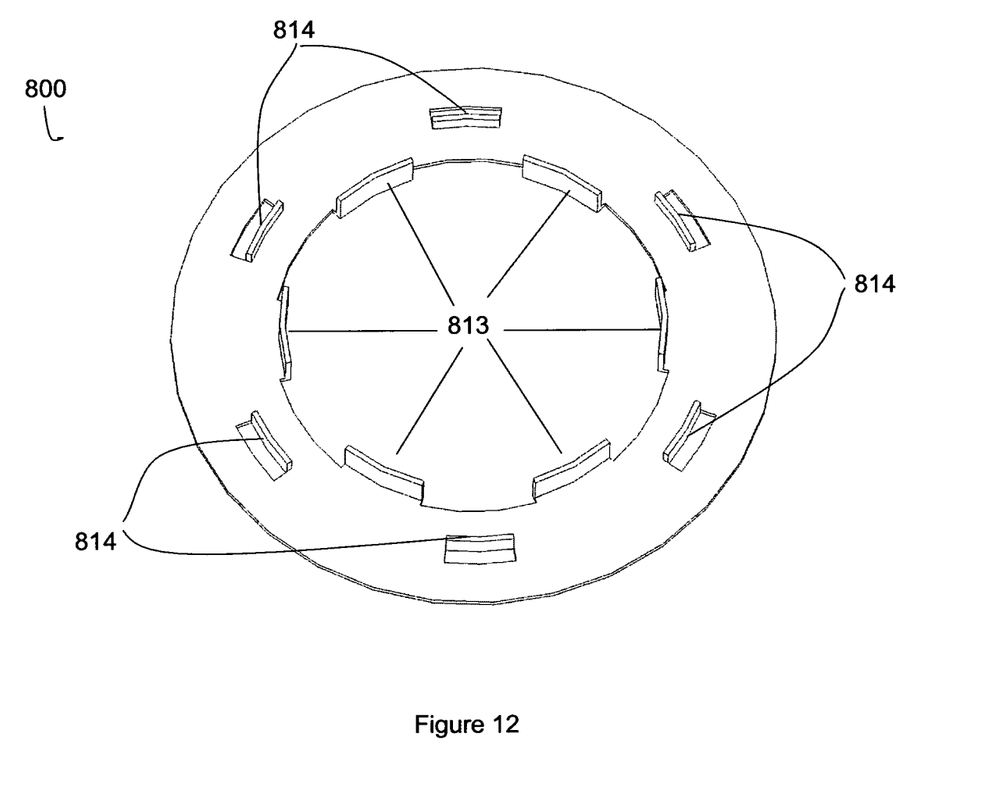
FIG. 12 illustrating a top view of another alternative second stator core in accordance with this invention.
Figure 13:
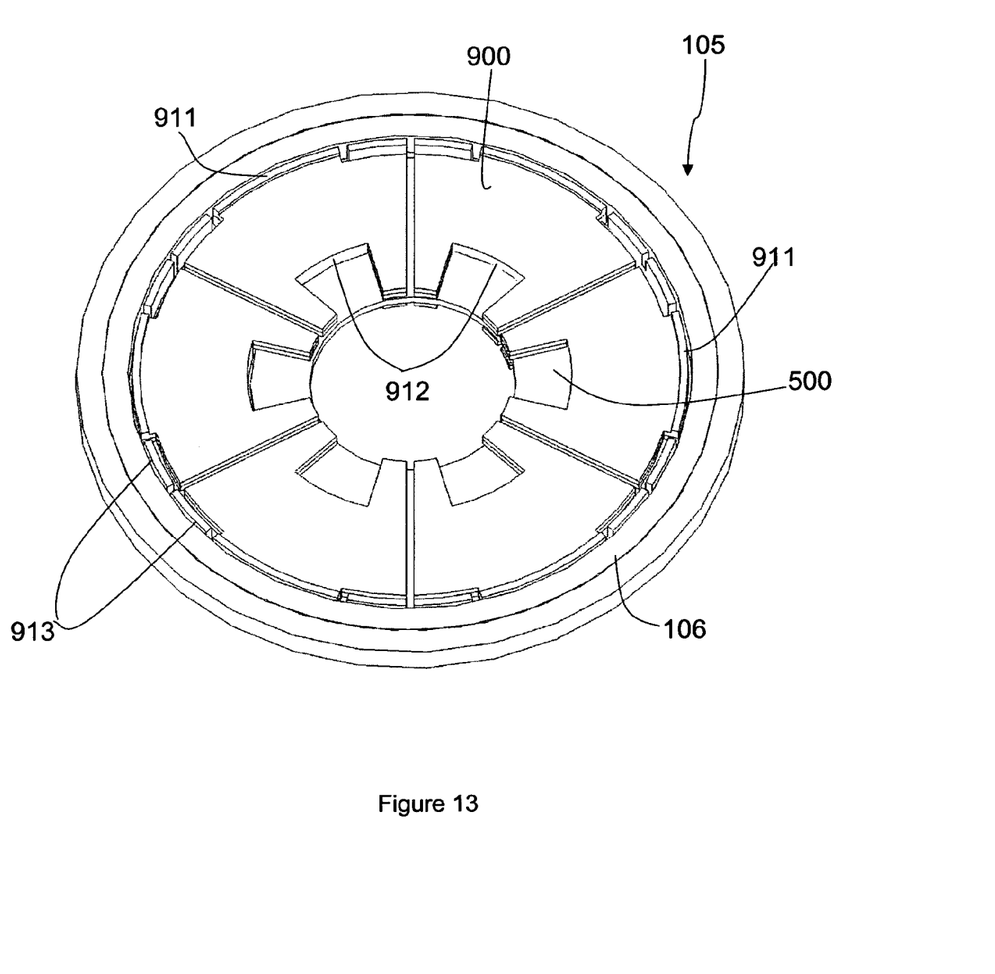
FIG. 13 illustrating a top view of an alternative electromagnetic motor in accordance with this invention.

FIG. 7 illustrates upper portion 200 and lower portion 300 of the first stator core 120 of the stator assembled. Coupling teeth 212 and 312 extend out from a first side of first stator core 110 to be inserted inside windings 500 and linked with coupling teeth 614 of second stator core 600. In this embodiment, coupling teeth 212, 312 and 614 are each made of one extension from adjoining ends of adjacent segments 210, 310 and 610. However, it is envisioned that other configurations may have a single tooth formed on each segment. One skilled in the art will recognize that the positions of teeth on the first and second stator cores 120 and 600 of the stator may be changed. One example of a different configuration is shown in FIGS. 11 and 12. These portions can also be developed for the motor has outer rotor, as being illustrated in FIG. 13. Furthermore, it is envisioned that first stator core 120 could be made of one integrated component without departing from this invention. However, this is left as a design choice to those skilled in the art.

Figure 8:
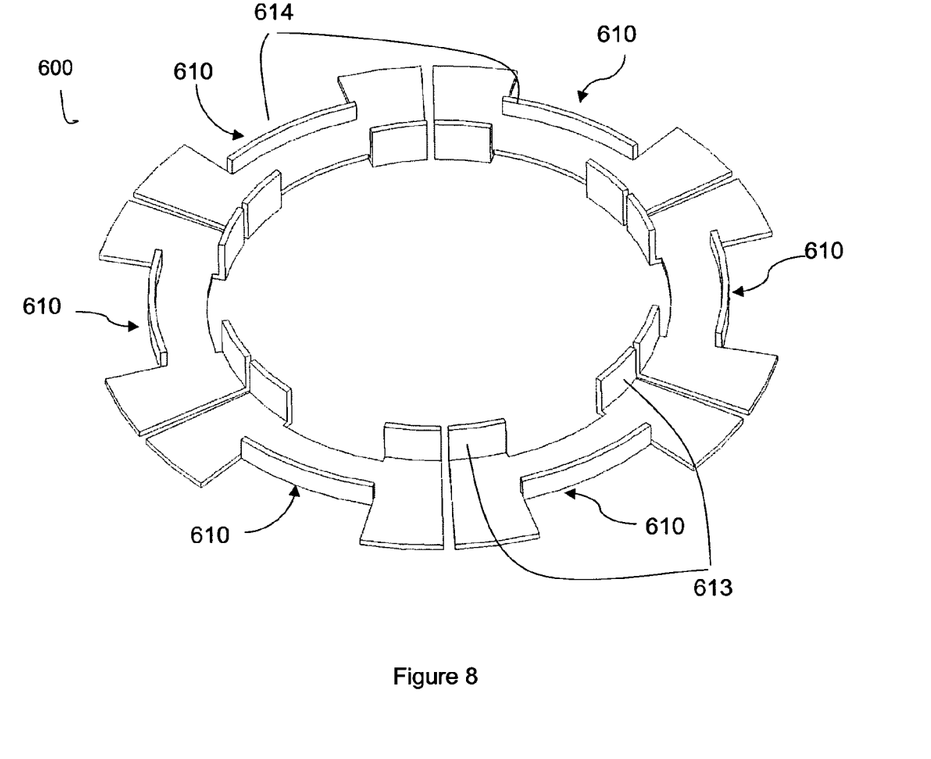
FIG. 8 illustrating a top view of a second stator core shown in FIG. 2.

FIG. 8 illustrates second stator core 600, which is formed by segments 610 in accordance with this invention. Second stator core 600 is made of segments 610 aligned concentrically around an opening for rotor 105. Segments 610 are made of ferrite material and have teeth 613 and 614 formed at opposing ends of the base on an inner edge defining the rotor opening. Although other soft magnetic materials may be used. The choice of material is left to those skilled in the art.

Figure 9:
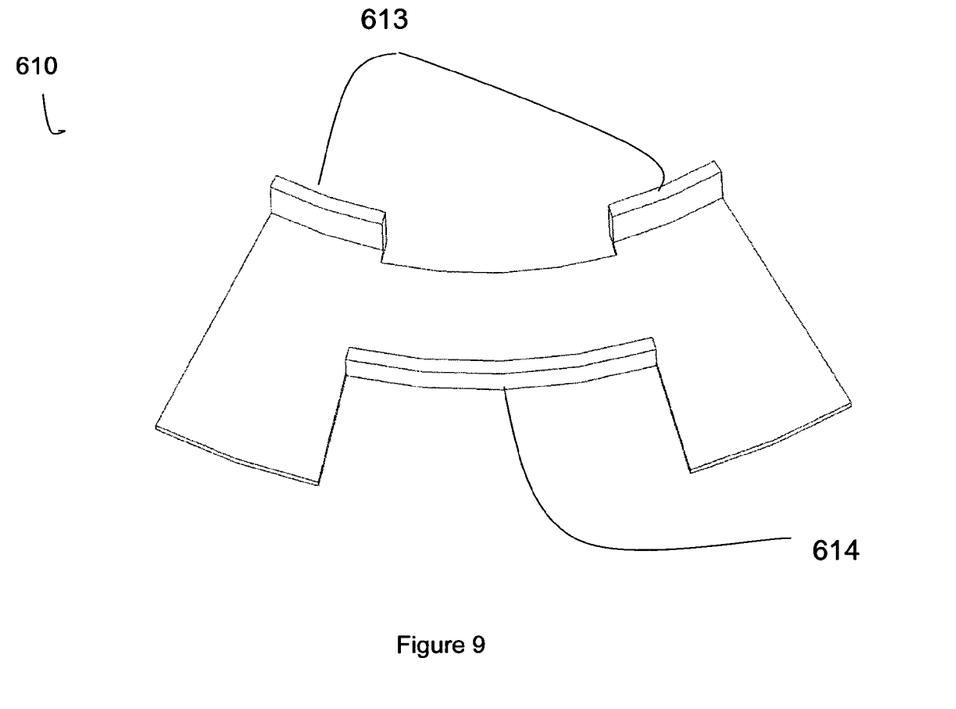
FIG. 9 illustrating a top view of a segment of the second stator core shown in FIG. 8.

FIG. 9 illustrates one segment 610. In this embodiment, segment 610 includes two teeth 613 on opposing sides of an inner edge of segment 610. One skilled in the art will recognize that in other configuration one or more teeth 613 may be placed along the inner edge without departing from this invention. Each of teeth 613 extend outward from segment 610 in a direction substantially perpendicular to a surface of segment 610 in direction toward first stator core 120. Each of teeth 613 may be formed by punching, pressing, folding, or any other method. The exact method of manufacture being a design choice left to one skilled in the art.

Each segment 600 has one of coupling teeth 614 of second stator core 600. Each of coupling teeth 614 extends upwards substantially perpendicular to a surface of a segment 610 in the same direction as teeth 613. Each of coupling teeth 614 extends upwards through an opening in windings 500 and contacts coupling teeth of first stator core 120. Each of the coupling teeth 614 may be formed on a segment 610 by punching, pressing, folding, or any other method. The exact method of manufacture being a design choice left to one skilled in the art. Furthermore, one skilled in the art will recognize that other couplings and locations for the couplings may be changed and these are left for a design choice for those skilled in the art.

One skilled in the art will recognize that the positions of teeth 613 and couplings 614 may be changed, and the segment structure may also be changed. However, one skilled in the art will recognize that this position may be varied. Two examples of a different configuration are shown in FIGS. 11 and 12.

One skilled in the art will further recognize that the motor configuration may also be changed to outer rotor structure in accordance with this embodiment of the invention, and FIG. 12 illustrates an example of the outer rotor motor, where the magnet 106 surrounds the stator core 400. However, one skilled in the art will recognize that this position may be varied.

Figure 14:
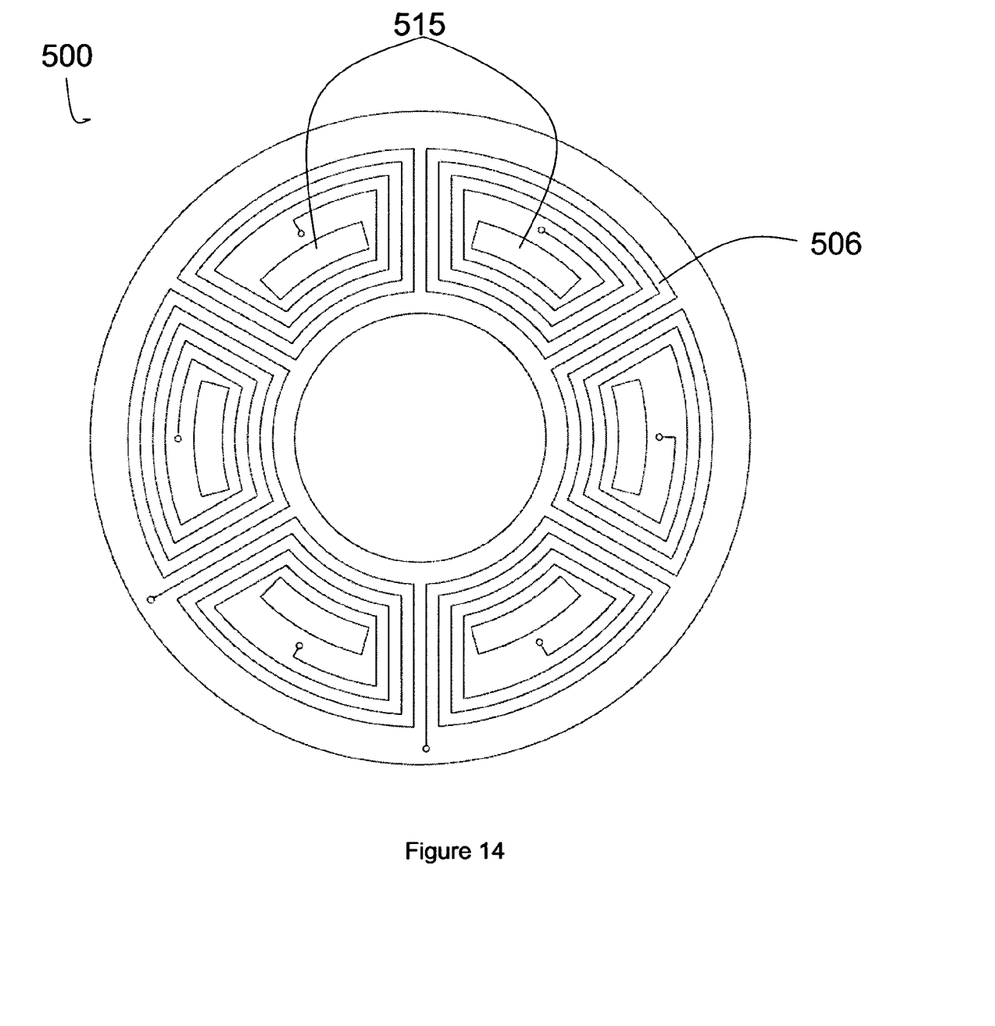
FIG. 14 illustrating a top view of windings in accordance with this invention.

FIG. 14 illustrates the structure of windings 500. Windings 500 have openings 515 defined through wires 506 to allow couplings of the first stator core 100 and second stator core 600. It is contemplated windings 500 can be made in the conventional manner. However, in this embodiment, windings 500 is a two dimensional structure to reduce the thickness of motor 100. Windings 500 are distributed in plane layers. Preferably, the distribution is made using Printed Circuit Board (PCB) technology, or bonded wire technology. In PCB, windings 500 can be made in multiple cycles which increase design choice parameters and the selection of magnetic pole-pairs.

Figure 10:
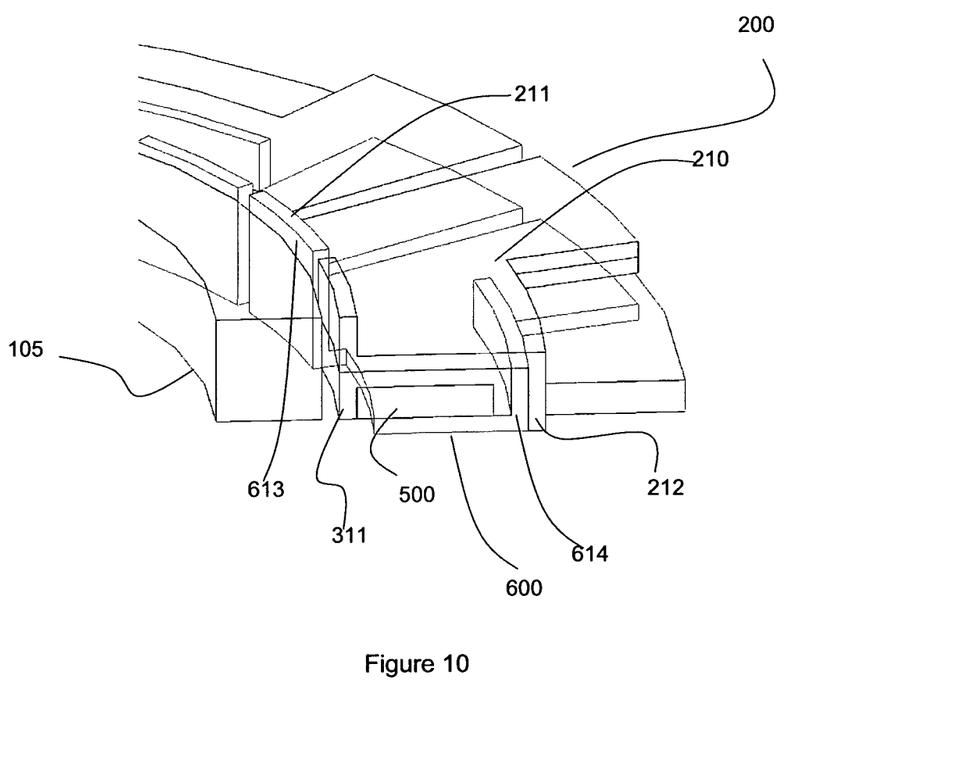
FIG. 10 illustrating a cross section of the electromagnetic motor shown in FIG. 1.

FIG. 10 illustrates a cross section of an assembled motor 100 in accordance with this embodiment of the invention. As can be seen in FIG. 10, second stator core 600 is on the bottom of the stator. Teeth 211, 311 and 613, of stator cores 200, 300 and 600 affront magnets on rotor 105. Windings 500 are enclosed between tooth 211, 311, 613; and the assembly of upper and lower portions 200, 300 of first stator core 120 and second stator 600.

When a current is applied, magnetic flux flows are generated in motor 100 in the following manner. A field, started by one magnet, passes through an air gap and enters tooth 211 and 311. The field passes through upper and lower portion 200, 300 to portions 212 and 312. The field then flows to second stator core 600 through the coupling of portions 212, 312 and 614. The field then passes to the tooth 613 of second stator core 600. The field then enters another pole of the magnet through air gap tooth 613. Windings 500 couple with the magnetic field to realize the conversion of electrical to magnetic energy.

The above is a description of one embodiment of a stator core assembly in accordance with this invention. It is envisioned that those skilled in the art can and will design alternative systems that can and will infringe on this invention as set forth in the following claims.

What is claimed is:

1. A stator assembly for a low profile magnet synchronous motor comprising:
   windings of conductive material;
   a first stator core having a base;
   a second stator core having a base wherein said windings are located between said first stator core and said second stator core;
   a first plurality of teeth extending outward from said base of said first stator core wherein each of said first plurality of teeth extends through a layer defined by said windings; and
   a second plurality of teeth extending outward from said base of said second stator core wherein each of said second plurality of teeth extends through said layer defined by said windings,
   wherein said first stator core comprises couplings for contact with said second stator core;
   wherein said couplings comprise a coupling tooth extending out from a surface of said first stator core towards said second stator core; and
   wherein said coupling tooth extends outward from an inner edge of said first stator core around an opening through a center of said first stator core.

2. The stator assembly of claim 1 wherein each of said first plurality of teeth extends outward substantially perpendicular to said base of said first stator core.

3. The stator assembly of claim 1 wherein each of said second plurality of teeth extends outward substantially perpendicular to said base of said second stator core.

4. The stator assembly of claim 1 wherein said windings comprise:
   a conductive coil formed by windings arranged on a planar surface.

5. The stator assembly of claim 4 wherein said windings comprise:
   a printed circuit board.

6. The stator assembly of claim 4 wherein said windings comprise:
   bonded wires.

7. The stator assembly of claim 4 wherein said windings further comprise:
   a plurality of printed circuit boards forming said conductive coil.

8. The stator assembly of claim 1 wherein said windings comprise:
   a plurality of openings defined through said conductive material.

9. The stator assembly of claim 8 wherein each of said first plurality of teeth extends through one of said plurality of openings.

10. The stator assembly of claim 8 wherein each of said second plurality of teeth extends through one of said plurality of openings.

11. The stator assembly of claim 1 wherein said windings comprises:
    a center opening defined through a center of said windings for receiving a rotor having a plurality of magnetic poles.

12. The stator assembly of claim 11 wherein each of said first plurality of teeth extends through said center opening.

13. The stator assembly of claim 11 wherein each of said second plurality of teeth extends through said center opening.

14. The stator assembly of claim 1 wherein each of said first plurality of teeth extends through said layer outside said windings.

15. The stator assembly of claim 1 wherein each of said second plurality of teeth extends through said layer outside said windings.

16. The stator assembly of claim 1 wherein said coupling tooth extends from an outer edge of said first stator core.

17. The stator assembly of claim 1 wherein said first stator core comprises:
    a plurality of segments.

18. The stator assembly of claim 17 wherein each of said plurality of segments comprises:
    a base;
    a tooth that extend outwards substantially perpendicular from said base; and
    a coupling that extends outwards substantially perpendicular from said base.

19. The stator assembly of claim 18 wherein said tooth extends outward from an outer edge of said base.

20. The stator assembly of claim 18 wherein said tooth extends outward from an inner edge of said base proximate an opening through a center of said stator assembly.

21. The stator assembly of claim 18 wherein said coupling extends outward from said outer edge of said base.

22. The stator assembly of claim 18 wherein said coupling extends outward from an inner edge proximate an opening through a center of said stator.

23. The stator assembly of claim 1 wherein said first stator core comprises:
    a upper portion having a base with a first surface and a second surface opposite said first surface; and
    a lower portion having a base with a first surface and a second surface wherein said second surface of said upper portion contacts said first surface of second portion.

24. The stator assembly of claim 23 wherein said first stator core further comprises:
    a first plurality of teeth components that extend outward from said upper portion away from said lower portion; and
    a second plurality of teeth components that extend outward from said lower portions away from said upper portion wherein each of said second plurality of teeth components is aligned with one of said first plurality of teeth components to make one of said first plurality of teeth.

25. The stator assembly of claim 24 wherein said first plurality of teeth components and said second plurality of teeth components are on an outer perimeter of said upper portion and said lower portions.

26. The stator assembly of claim 24 wherein said first plurality of teeth components and said second plurality of teeth components are on an inner perimeter of said upper portion and said lower portions around an opening through said center of said second stator core.

27. The stator assembly of claim 23 wherein said first stator core further comprises:
    a plurality of couplings on said upper and lower portions wherein each of said couplings contact a coupling of said second stator core.

28. The stator assembly of claim 27 wherein each of said plurality of couplings comprises:
    an opening defined through said base of said lower portion;
    a coupling tooth extending out of said base of said lower portion along an edge of said opening for contacting a coupling protruding through said opening; and a coupling tooth extending outward from said second surface of said upper portion and into said opening contacting said coupling extending through said opening.

29. The stator assembly of claim 27 wherein said upper portion and said lower portion each comprise a plurality of segments that are configured to make each of said upper portion and said lower portion.

30. The stator assembly of claim 1 wherein said second stator core comprises:
   a plurality of segments.

31. The stator assembly of claim 30 wherein each of said plurality of segments of said second stator core comprises:
   a base;
   a tooth that extend outwards substantially perpendicular from said base; and
   a coupling that extends outwards substantially perpendicular from said base.

32. The stator assembly of claim 30 wherein said tooth extends outward from an outer edge of said base.

33. The stator assembly of claim 30 wherein said tooth extends outward from an inner edge of said base proximate an opening through a center of said stator assembly.

34. The stator assembly of claim 30 wherein said coupling extends outward from said outer edge of said base.

35. The stator assembly of claim 30 wherein said coupling extends outward from an inner edge proximate an opening through a center of said stator.

36. The stator assembly of claim 30 wherein said coupling comprises:
   a coupling tooth.

37. The stator assembly of claim 30 wherein second stator core comprises:
   a plurality of teeth on said segment.

38. The stator assembly of claim 37 wherein said plurality of teeth comprise:
   a first tooth on a first side of an inner edge of said base; and
   a second tooth on a second side of said inner edge of said base opposite said first side.

* * * * *